United States Patent [19]

Reynolds, Jr.

[11] Patent Number: 4,959,518
[45] Date of Patent: Sep. 25, 1990

[54] METHOD OF WELDING STAINLESS STEEL STUDS

[75] Inventor: Samuel D. Reynolds, Jr., Oviedo, Fla.

[73] Assignee: Westinghouse Electric Corp., Pittsburgh, Pa.

[21] Appl. No.: 359,020

[22] Filed: May 30, 1989

[51] Int. Cl.⁵ .............................................. B23K 9/20
[52] U.S. Cl. .............................. 219/99; 219/137 WM
[58] Field of Search ................... 219/137˙WM, 145.22, 219/146.41, 99; 420/584

[56] References Cited

U.S. PATENT DOCUMENTS

| | | | |
|---|---|---|---|
| 3,723,102 | 3/1973 | Lowe | 75/128 |
| 3,837,846 | 9/1974 | Becker et al. | 75/124 |
| 3,865,644 | 2/1975 | Hellner et al. | 148/37 |
| 4,443,406 | 4/1984 | Sukekawa et al. | 420/584 |
| 4,444,589 | 4/1984 | Sugitani et al. | 75/128 |

FOREIGN PATENT DOCUMENTS 977586 11/1975 Canada ................................... 75/14

Primary Examiner—Clifford C. Shaw
Attorney, Agent, or Firm—K. Bach

[57] ABSTRACT

A method of stud welding stainless steel studs to carbon steel or low alloy steel components with formation of a ductile weld therebetween. The chromium equivalent and nickel equivalent of the steel component is determined and a stainless steel stud provided that has a chromium equivalent and nickel equivalent content which, upon dilution thereof by steel of the component during stud welding, will provide a structure of austenite plus ferrite in the resulting weld structure, and stud welding the specified stainless steel stud to the steel component.

10 Claims, 2 Drawing Sheets

METHOD OF WELDING STAINLESS STEEL STUDS

FIELD OF THE INVENTION

The present invention relates to a method of stud welding of stainless steel studs to carbon steel or low alloy steel components so as to produce a ductile weld.

BACKGROUND OF THE INVENTION

Stud welding is a general term for joining a metal stud to a workpiece such as a metal plate. A particularly useful stud welding technique is stud arc welding which involves the joining of the base or end of a stud to the workpiece by heating them with an arc drawn between the two components. After proper heating of the two components they are brought together under pressure, such as by use of a stud welding gun, with melting of a portion of the stud and the other component or base metal. The most common stud materials that are welded with the arc weld process are low carbon steel, stainless steel, and aluminum. Generally, in such welding, the stainless steel melt of the stud is diluted from a carbon steel or low alloy steel melt in the weld in an amount of about 20 to 50 percent by weight.

Although stainless steel studs, typically 304 stainless steel, are routinely welded to carbon steel or low alloy steel plate, the problem always exists of the lack of ductility of the weld. Because of the lack of ductility, some normal tests are not met, such as the normal ASME Section IX QW 192.1, 15° bend and re-straighten test of the Boiler and Pressure code. The AWS D1.1 bend test requirement of 7.6.5 is considerably more severe than the ASME requirement so this also cannot be achieved by routine welding of stainless steel studs to carbon steel base plate.

It is an object of the present invention to provide a method for stud welding stainless steel studs to a carbon steel or low alloy steel component in a manner that produces a ductile weld metal.

SUMMARY OF THE INVENTION

With this object in view, the present invention resides in a method of stud welding stainless steel studs to carbon steel or low alloy steel components, such as plates, and producing a ductile weld therebetween by estimating the dilution percentage of component metal and the chromium equivalent and nickel equivalent of steel component, then providing a stainless steel stud having a chromium equivalent and nickel equivalent content which upon stud welding to the steel component, with dilution thereof from the steel of the component, will provide a structure of austenite plus ferrite in the resulting weld structure, and stud welding the required stainless steel stud to the steel component. During the stud welding of the required stainless steel stud to the steel component, the weld metal, which is an admixture of stud metal and the steel component metal, will produce a structure of austenite and ferrite in the resulting weld structure and thus provide a ductile weld between the stainless steel stud and the carbon steel or low alloy steel component.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION

In the present method, a ductile stud weld between a stainless steel stud and a carbon steel or low alloy steel component is provided by the use of specially controlled chemistry austenitic materials that are capable of producing an austenite plus ferrite microstructure in the resulting weld structure which retains the ductility with the dilution encountered from the carbon steel or low alloy steel component.

The component to which the stainless steel stud is welded, according to the present invention is composed of carbon steel or a low alloy steel. Pressure vessel carbon steels are those steels which contain a carbon content that does not exceed 0.4 percent by weight and, in addition to carbon, contain small amounts of silicon, manganese, phosphorus and sulfur derived from the raw materials and fuel used in the steelmaking process. The term "low alloy steels" as used herein describes steels containing alloying ingredients as described in the 1983 Edition, ASME Boiler and Pressure Vessel Code, Table UCS-23 Section VIII—Division 1. pp 258–264 which describes the Maximum Allowable Stress Values in Tension for Carbon and Low-Alloy Steel.

The stud that is welded to the carbon or low alloy steel component is composed of austenitic stainless steel, which steel contains in excess of about 18 percent by weight chromium and at least 8 percent nickel.

According to the present invention, the chromium equivalent and the nickel equivalent of the carbon steel or low alloy steel component are determined and a stainless steel stud provided that has a chromium equivalent and nickel equivalent which, upon stud welding with dilution with the steel component, will provide a structure of austenite plus ferrite in the resulting weld. For the purposes of the present invention, the chromium equivalent is a value expressed by the following formula:

$$CR\ equivalent = \%\ CR + \%\ Mo + 1.5 \times \%\ Si + 0.5 \times \%\ Cb;$$

while the nickel equivalent is a value expressed by the following formula:

$$Ni\ equivalent = \%\ Ni + 30 \times \%\ C + 0.5 \times \%\ Mn.$$

During stud welding, the molten metal at the end of the stud is diluted by molten metal from the component to which it is welded. Such dilution is generally in the range of about 20 to 50 percent by weight, more generally 20 to 40 percent by weight, with a 30 percent by weight dilution being typical. Also, the present invention is concerned only with stud welding where no additional metal is added to the weld, with the resulting weld containing only metal from the stud and the steel component to which the stud welded.

Figure 1:
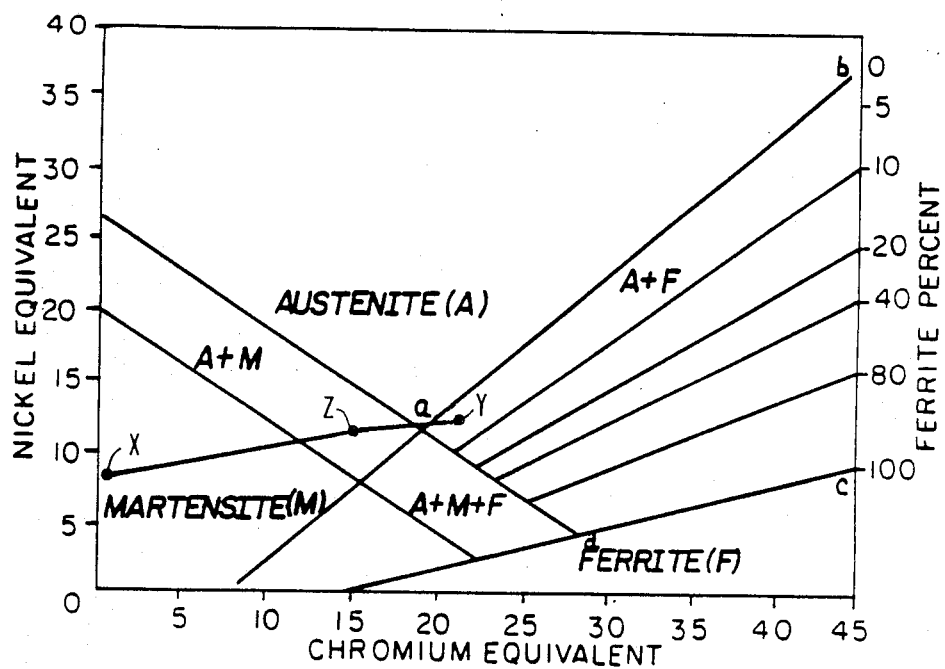
FIG. 1 is a diagram of chromium equivalent versus nickel equivalent in an iron-chromium-nickel composition patterned after a Schaeffler diagram showing a conventional stud welding composition formed by stud welding a conventional stainless steel stud.

The standard austenitic stud used for stud welding to carbon steel is AISI304. By referring to FIG. 1, for explanation purposes, the chromium equivalent of the carbon steel can be assumed to be 0.45 and the nickel equivalent 7.8 (Point X). For a 304 austenitic stud, the chromium equivalent can be assumed to be 20 and nickel equivalent to be 11.3 (Point Y). The resultant weld, assuming 30 percent dilution (Point Z), is brittle austenitic plus martensitic structure. The desired austenitic weld structure as repeatedly shown in the technical literature is austenite plus delta ferrite.

Figure 2:
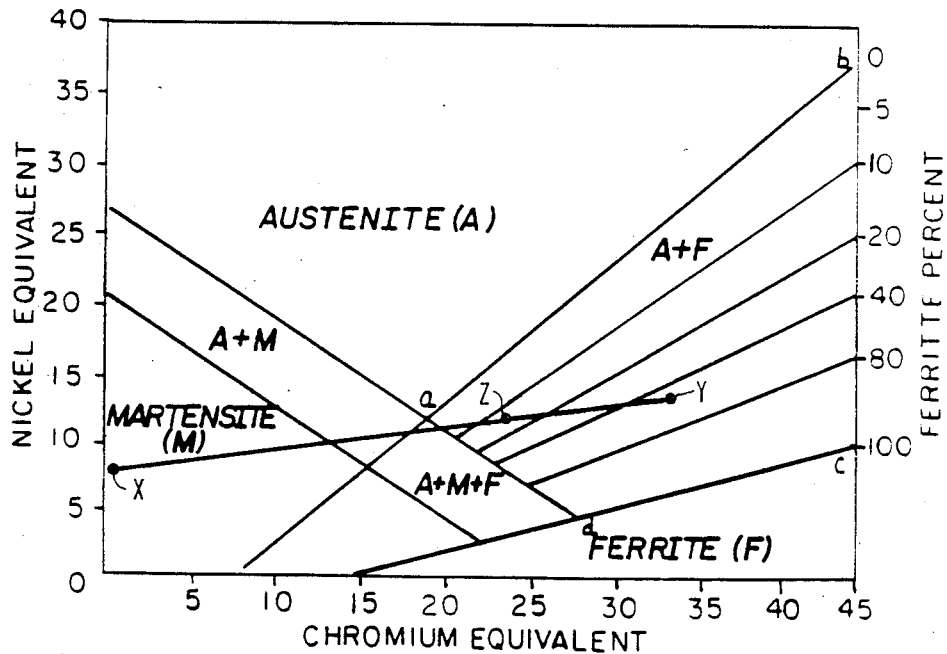
FIG. 2 is a diagram of chromium equivalent versus nickel equivalent in an iron-chromium-nickel composition patterned after a Schaeffler diagram illustrating the patterned invention for stainless steel stud welding with carbon steel components.

Referring now to FIG. 2, the application of the present method to the stud welding of a stainless steel stud to a carbon steel component to produce a ductile weld is illustrated. For explanatory purposes, the chromium equivalent of the carbon steel is assumed to be $[0+0+(1.5\times0.3)+0=0.45]$ and the nickel equivalent is assumed to be $[0+(30\times0.25)+(0.5\times0.8)=7.8]$ (Point X). As illustrated, if an austenitic stainless steel stud with a chromium equivalent of 32 and a nickel equivalent of 12.7 (Point Y) is used, the resultant weld, assuming about 30 percent dilution of the stainless steel stud metal with carbon steel metal, would structurally be austenite plus ferrite and consequently ductile (Point Z). The austenite plus ferrite composition of the resulting weld is that falling within the area bounded by line abcd in the drawing.

Figure 3:
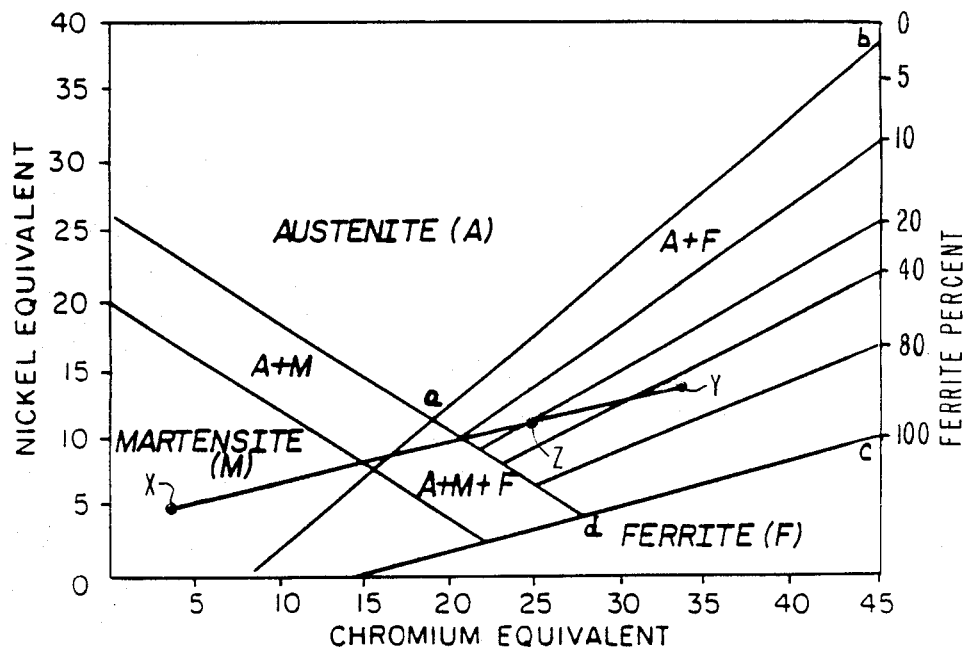
FIG. 3 is a diagram of chromium equivalent versus nickel equivalent in an iron-chromium-nickel composition as in FIG. 1 illustrating the present invention for stainless steel stud welding with low alloy steel components.

In FIG. 3, there is illustrated the application of the present method to the stud welding of a stainless steel stud to a low alloy steel component. For explanatory purposes, the low alloy steel component, a steel containing 2.25 percent Cr—1 percent Mo alloy content would provide a chromium equivalent of 4 and a nickel equivalent of 5 (Point X). If an austenitic stainless steel stud with a chromium equivalent of 32 and a nickel equivalent of 12.7 (Point Y) is used, with 30 percent dilution resulting, the same would provide a weld that would structurally be austenite plus ferrite and consequently ductile (Point Z). Again, a composition falling within the area bounded by line abcd would provide an austenite plus ferrite structure in the resulting weld.

Conventionally available materials can be obtained that have a sufficient Cr/Ni equivalent ratio that will produce an austenite plus ferrite ductile stud weld with about 30 percent dilution with carbon or low alloy steels. For example, an austenitic stainless steel stud containing about 29 percent by weight chromium and about 9 percent nickel, such as 312 in ASME SFA 5.9 (Type ER312) or wrought equivalent will produce the desired metallurgical structure and a weld with sufficient ductility to pass the aforementioned bend test. If a higher Cr equivalent is needed to produce the desired chemistry due to a dilution percentage in excess of 30 percent a selected chemistry 312 stainless steel can be obtained or a special chemistry stainless developed for this use.

The present invention thus provides a method for stainless steel stud arc welding to carbon steel or low alloy steel components where the composition of the stud is metallurgically selected to produce a controlled chromium equivalent and nickel equivalent ratio capable of producing a ductile weld structure in the resultant weld.

What is claimed is:

1. A method for stud welding stainless steel studs to carbon steel or low alloy steel components and producing a ductile weld therebetween, comprising:
   determining the chromium equivalent and nickel equivalent contents of the steel component;
   providing a stainless steel stud having a chromium equivalent and nickel equivalent content which, upon stud welding thereof with dilution by the steel from said steel component, will provide a structure of austenite plus ferrite in said resulting structure; and
   welding said stainless steel stud to said steel component such that the weld metal, on admixture of the stud metal and the steel component metal, will produce a structure of austenite and ferrite in the resulting weld structure and thus a ductile weld between said stud and said component.

2. The method of stud welding as defined in claim wherein said stainless steel stud contains a chromium equivalent of about 32 and a nickel equivalent of about 12.7.

3. The method of stud welding as defined in claim 1 wherein the dilution of said stud composition by said steel component composition during the stud welding is in an amount of about 20 to 50 percent based on the weight of the stud metal of said weld.

4. The method of stud welding as defined in claim 1 wherein said steel component is formed from carbon steel and said stud is composed of a stainless steel containing a about 29 percent chromium and 9 percent nickel.

5. The method of stud welding as defined in claim wherein said steel component is formed from a low alloy steel and said stud is composed of a stainless steel.

6. A method for stud welding stainless steel studs to carbon steel components and producing a ductile weld therebetween, comprising:
   determining the chromium equivalent and nickel equivalent contents of the carbon steel component;
   providing a stainless steel stud having a chromium equivalent and nickel equivalent content which, upon stud welding thereof with dilution of the stud composition by the steel from said carbon steel component, in an amount of about 20 to 50 percent based on the weight of the stud metal of the resulting weld, will provide a structure of austenite plus ferrite in said resulting structure; and
   welding said stainless steel stud to said carbon steel component such that the weld metal, on admixture of the stud metal and the carbon steel component metal, will produce a structure of austenite and ferrite in the resulting weld structure and thus a ductile weld between said stud and said component.

7. The method of stud welding as defined in claim 6 wherein said stainless steel stud contains a chromium equivalent of about 32 and a nickel equivalent of about 12.7.

8. The method of stud welding as defined in claim 6 wherein said steel component is formed from carbon steel and said stud is composed of a stainless steel containing about 29 percent chromium and 9 percent nickel.

9. A method for stud welding stainless steel studs to low alloy steel components and producing a ductile weld therebetween, comprising:

determining the chromium equivalent and nickel equivalent contents of the low alloy steel component;

providing a stainless steel stud having a chromium equivalent and nickel equivalent content which, upon stud welding thereof with dilution of said stud composition by the steel from said low alloy steel component, in an amount of about 30 to 50 percent based on the weight of the stud material of the resulting weld, will provide a structure of austenite plus ferrite in said resulting structure; and welding said stainless steel stud to said low alloy steel component such that the weld metal, on admixture of the stud metal and the low alloy steel component metal, will produce a structure of austenite and ferrite in the resulting weld structure and thus a ductile weld between said stud and said component.

10. The method of stud welding as defined in claim 9 wherein said stainless steel stud contains a chromium equivalent of about 32 and a nickel equivalent of about 12.7.

* * * * *